United States Patent [19]
Havens et al.

[11] Patent Number: 5,116,634
[45] Date of Patent: May 26, 1992

[54] APPARATUS AND METHOD FOR CONSISTENT SPRAY PROPORTIONING OF LIQUID TO DRY MATERIAL

[75] Inventors: Terry L. Havens, Wenona; Arthur C. Guede, East Peoria, both of Ill.

[73] Assignee: Phoenix Park Systems, Wenona, Ill.

[21] Appl. No.: 396,090

[22] Filed: Aug. 21, 1989

[51] Int. Cl.⁵ .............................................. B05D 7/00
[52] U.S. Cl. .......................................... 427/4; 427/8; 427/212; 427/424; 118/684; 118/303; 118/313
[58] Field of Search ...................... 427/8, 424, 4, 212; 112/664, 668, 688, 690, 665, 683, 684, 704, 303, 313

[56] References Cited

U.S. PATENT DOCUMENTS

| | | | |
|---|---|---|---|
| 3,279,423 | 10/1966 | Russell | 118/683 |
| 3,796,412 | 3/1974 | Maurer | 118/303 X |
| 4,535,722 | 8/1985 | Kondo | 118/688 X |
| 4,572,845 | 2/1986 | Christen | 118/303 |
| 4,605,297 | 8/1986 | Livingston et al. | 118/688 X |

*Primary Examiner*—Shrive Beck
*Assistant Examiner*—Alain Bashore
*Attorney, Agent, or Firm*—Marshall, O'Toole, Gerstein, Murray & Bicknell

[57] ABSTRACT

Apparatus and method for controlling the operation of a plurality of nozzles for spraying a liquid substance on a product. The nozzles have different flow volumes and are located adjacent the product. A sensor measures the quantity of the product, and a control responsive to the sensor opens selected nozzles to produce a desired ratio of the quantity of the substance to the quantity of the product. There is further provided another sensor for measuring the quantity of the substance, the control being responsive to the two sensors and operative to determine the actual ratio of the quantity of the substance to the quantity of the product and to adjust the actual ratio to match the desired ratio.

6 Claims, 2 Drawing Sheets

| .4 | .2 | .1 | .13 - .18 | GPM-TOTAL |
|---|---|---|---|---|
| 18d | 18c | 18b | 18a | |
| OFF | OFF | OFF | OFF | 0 |
| OFF | OFF | ON | OFF | .10 |
| OFF | OFF | OFF | ON | .13 - .18 |
| OFF | ON | OFF | OFF | .20 |
| OFF | OFF | ON | ON | .23 - .28 |
| OFF | ON | ON | OFF | .30 |
| OFF | ON | OFF | ON | .33 - .38 |
| ON | OFF | OFF | OFF | .40 |
| ON | OFF | OFF | ON | .43 - .48 |
| ON | OFF | ON | OFF | .50 |
| ON | OFF | ON | ON | .53 - .58 |
| ON | ON | OFF | OFF | .60 |
| ON | ON | OFF | ON | .63 - .68 |
| ON | ON | ON | OFF | .70 |
| ON | ON | ON | ON | .73 - .78 |
| ON | ON | ON | ON | .83 - .88 |

APPARATUS AND METHOD FOR CONSISTENT SPRAY PROPORTIONING OF LIQUID TO DRY MATERIAL

FIELD AND BACKGROUND OF THE INVENTION

This invention relates to apparatus and method for controlling the volume of a liquid being applied, as by spraying, on a product.

There are numerous processes wherein a liquid is applied to a product and it is desirable to adjust the volume of the applied liquid for various reasons. For example, a series of products may be moving on a conveyor or assembly line and it is necessary to spray or coat the products with a liquid. The volume of the liquid may be adjusted in accordance with the quantity or weight of the product to be sprayed, for example, or the volume may be adjusted to change the ratio of the amount of liquid to the unit volume of the product. In the specific example described herein, a liquid oil is sprayed on grain for dust suppression purposes while the grain is moving in a conveyor.

In such a system it is also important that the spray pattern be consistently good so that the product or products will be evenly covered. The volume of the liquid could be adjusted by changing the pressure of the liquid flowing through a spray nozzle, but a change in the pressure may also produce an undesired change in the spray pattern. Further, there may be an optimum pressure for a good pattern from a spray nozzle, and, any pressure adjustment to change the volume might also decrease the quality of the spray pattern.

It is a general object of the present invention to provide a spray volume control system which avoids the foregoing problems.

SUMMARY OF THE INVENTION

Apparatus and method in accordance with the invention are for controlling the operation of a plurality of nozzles for spraying a liquid substance on a product. The nozzles have different flow volumes and are located adjacent the product, and includes a sensor for measuring the quantity of the product, a control responsive to the sensor for opening selected nozzles to produce a desired ratio of the quantity of the substance to the quantity of the product. There is further provided another sensor for measuring the quantity of the substance, the control being responsive to the two sensors and operative to determine the actual ratio of the quantity of the substance to the quantity of the product and to adjust the actual ratio to match the desired ratio.

BRIEF DESCRIPTION OF THE DRAWINGS

The invention will be better understood from the following detailed description taken in conjunction with the accompanying FIGS. of the drawings, wherein.

DETAILED DESCRIPTION OF THE DRAWINGS

Figure 1:
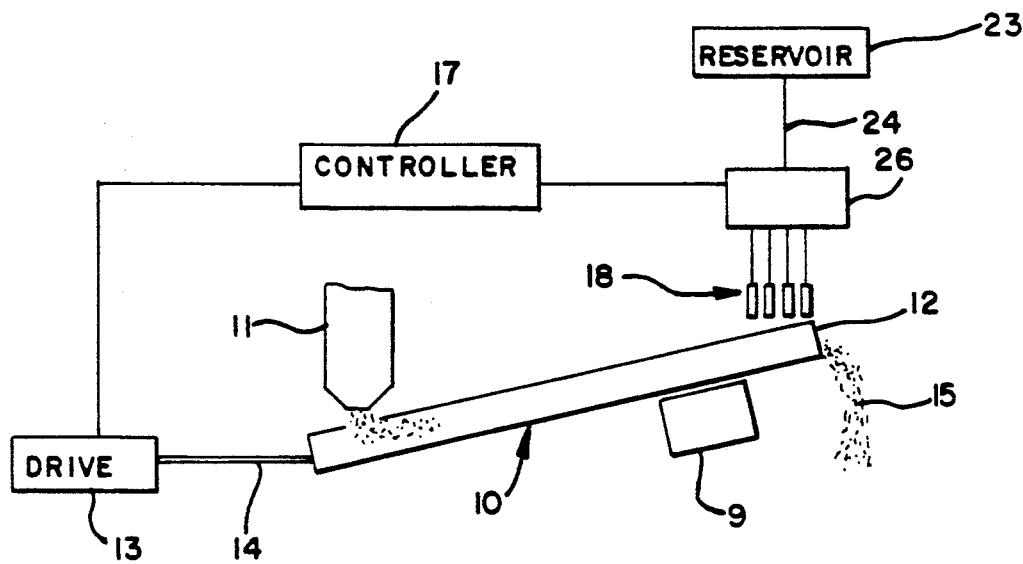
FIG. 1 is a diagrammatic view of a spray system including apparatus in accordance with the present invention.

With reference first to FIG. 1, the system comprises a conveyor 10 for moving a material, such as grain, from a hopper 11 to the upper end 12 of the conveyor. The conveyor 10 may be any type such as a belt conveyor or a marine bucket elevator. A drive 13, such as an electric motor, is coupled by a drive shaft 14 to drive the conveyor 10 in order to move the material 15 from the hopper 11 to the upper end 12 of the conveyor.

The system further includes a controller 17 which senses the quantity or volume of the material 15 moving up the conveyor 10 and regulates the amount of liquid oil flowing from a plurality of nozzles 18. In the present instance, the controller 17 receives a load representative signal from a coil or load current sensing transformer 19 (FIG. 2) coupled to one of the power lines 21 leading to an electric motor 22 which forms part of the drive 13. Instead, a scale 9 could be connected to the conveyor 10 for sensing the quantity of the material 15 moving on the conveyor. The current in the lines 21 is representative of the load on the drive motor 22, which, in turn, is representative of the amount of material 15 being moved by the conveyor 10. The liquid flowing to the nozzles 18 is received from a liquid reservoir 23 via a flow line 24, and the controller 17 operates a nozzle control 26 in order to control the quantity of liquid flowing from the nozzles 18.

Figure 2:
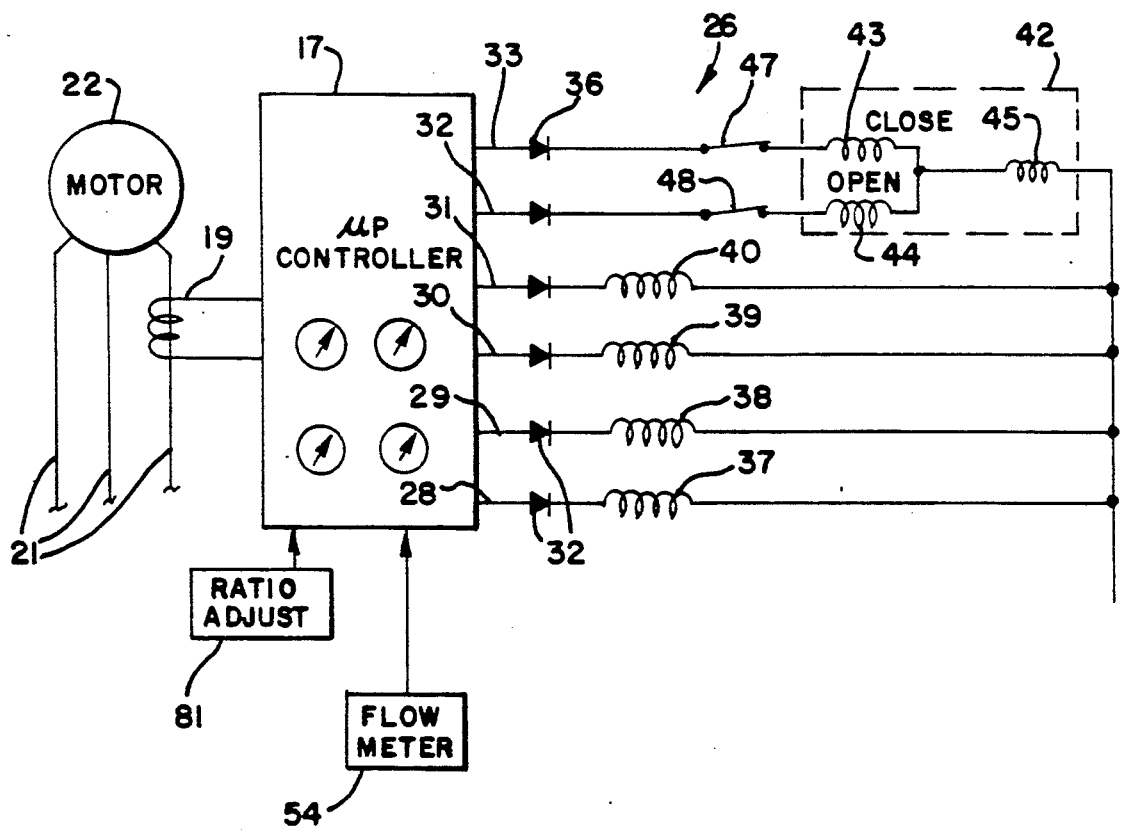
FIG. 2 is a schematic diagram of a portion of the apparatus shown in FIG. 1.

With specific reference to FIG. 2, the controller 17 may comprise a programed microprocessor which receives sensor signals and forms control signals on a plurality of selected output lines in order to control the operation of the nozzles 18. In the present example, there are six output lines 28 through 33. Each of the lines 28–31 is connected through a diode 36 to the winding 37–40 of a solenoid controlled liquid flow control valve. For example, when the controller 17 produces a signal on the line 30, current flows through the winding 39 and opens the flow control valve associated therewith. The two lines 32 and 33 are connected to control the operation of a motorized valve 42 which includes a "close" winding 43 and an "open" winding 44, in addition to a main winding 45. Normally closed switches 47 and 48 are connected in series with the windings 43 and 44, respectively. Assuming that the switches 47 and 48 are closed, when a signal appears on the line 33, current will flow through the close winding 43 and the main winding 45 and cause the motorized valve to move toward the close position. On the other hand, when a signal appears on the line 32, current flows through the windings 44 and 45 and causes the motorized valve to move toward the open position.

The microprocessor controller 17 receives sensor signals from the winding 19 representing the amount of material on the conveyor, and from a flowmeter 54 representing the actual quantity of the liquid being sprayed on the material. The controller 17 also includes a ratio adjustment for manually changing the ratio of the amount of liquid to the quantity of the material.

The operation of the circuit shown in FIG. 2 will be further described in connection with FIG. 3 which shows the control circuit 26 in greater detail. Oil flowing through the line 24 from the supply reservoir 23 preferably first flows through a heater 51 which adjusts the temperature and therefore the viscosity of the oil to a desired level. A conventional motor/pump drive 52 is connected in the line 24 for moving the fluid from the heater, through a filter 53, a flow meter 54 (also shown in FIG. 2) and to a manifold 56. The flow meter 54 may, for example, be an electronic flow meter which provides an accurate count of the volume of the liquid flowing through the line 24 to the manifold 56. The motor/pump 52 may produce a pressure in the manifold 56 of, for example, 60 psi; a gauge 57 provides an indication of the pressure in the manifold 56 and a thermometer 58 provides a temperature reading of the oil in the manifold 56.

From the manifold 56, oil flows through one branch 61 to a regulator 62 which reduces the pressure of the oil to a lower value which is optimum for the nozzles 18. The regulated oil flows through another manifold 63 which feeds the oil to three separate lines 64, 65 and 66. Connected in the line 64 is the solenoid controlled valve 38, connected in the line 65 is the solenoid controlled valve 39, and connected in the line 66 is the solenoid controlled valve 40, which are also shown in FIG. 2. Further connected in the line 64-65 downstream from the solenoids are metering valves 42 and flowmeters 43, and liquid nozzles 18b, 18c and 18d are connected to the lines 64-66 respectively. The metering valves 42 may be be needle valves which may be adjusted to achieve a fine tuning adjustment of the flow to the three nozzles. The flowmeters 43, of course, provide an indication of the volume of liquid flowing to each of the nozzles.

In addition to the branch 61, a second branch from the manifold 56 includes a line 71 which carries the liquid from the manifold 56 through a filter 72 to the motorized liquid control valve 42. The valve 42 includes the windings 43, 44 and 45 shown in FIG. 2. The valve 42 receives the liquid at the relatively high pressure existing in the manifold 56 and, by energizing the windings 43-45 as previously described, adjusts the pressure in a lower pressure range. Another solenoid controlled on-off valve 37 is connected in the line 71 downstream from the valve 42, and a metering valve 73 and a flowmeter 74 are located in the line 71 between the valve 42 and the nozzle 18a.

Figures 3, 4:
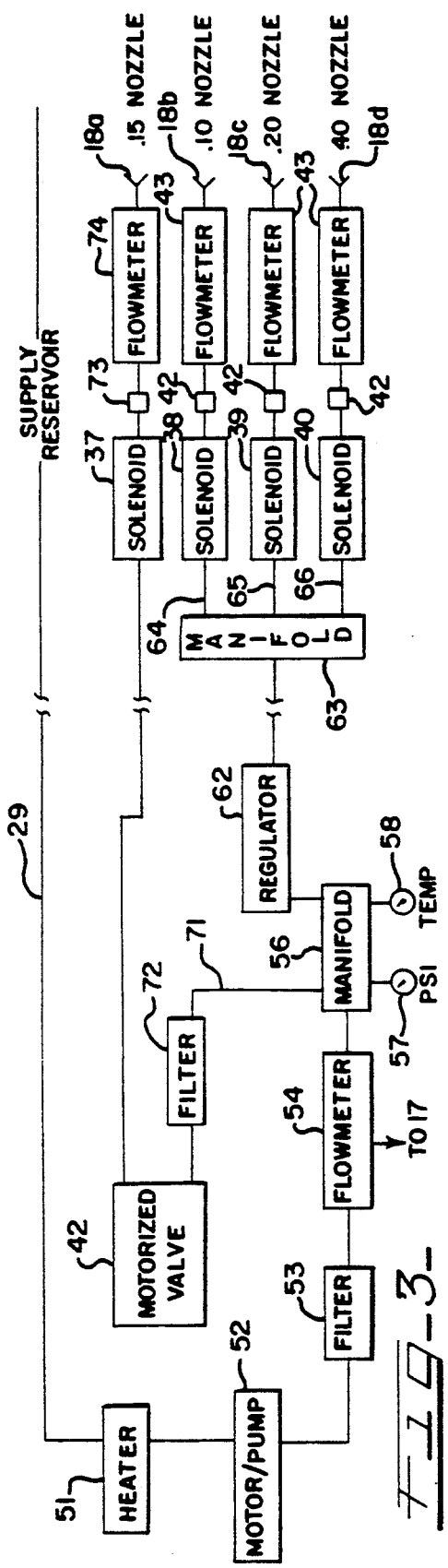
FIG. 3 is a block diagram of the apparatus.
FIG. 4 is a chart illustrating the operation of the invention.

With reference to FIGS. 3 and 4, the four nozzles 18a-18d have different size orifices and provide different flow rates. Further, the orifices are sized in such a manner that a total flow from the nozzles may be varied over a relatively broad range. In the specific example described herein, the nozzle 18b has a flow rate of 0.10 gallons per minute at the regulated pressure of 40 psi; the nozzle 18c has a flow rate of 0.20 gallons per minute at 40 psi; and the nozzle 18d has a flow rate of 0.40 gallons per minute at 40 psi. With regard to the fourth nozzle 18a, its orifice produces a flow rate in the range of from approximately 0.13 to approximately 0.18 gallons per minute, depending upon the pressure at the outlet of the motorized valve 42. When the valve 42 is completely open (by energizing the windings 44 and 45, the nozzle 18a produces a flow rate of 0.18 gallons per minute. On the other hand, when the motorized valve 42 is closed somewhat (by energizing the windings 43 and 45), the flow rate is reduced to approximately 0.13 gallons per minute. The function of the metering valves 42 and 73 is to enable a fine tuning to be made of the flow rates from the nozzles 18a-18d at the regulated pressures.

With reference to the chart shown in FIG. 4, it will be apparent that by selectively opening one, more than one, or all of the solenoids 38, 39 and 40, variation of the flow rate may be obtained in step-wise fashion to produce flow rates of 0.1, 0.2, 0.3, 0.4, 0.5, 0.6 and 0.7 gallons per minute. A further variation is produced by selectively opening the solenoid 37 and adjusting the pressure setting of the motorized valve 42 in combination with the energization of one or more of the solenoids 38-40 in order to produce a relatively smooth variation of the gallons per minute flow rate from the nozzles.

As previously mentioned, the microprocessor controller 17 controls the operation of the solenoids 37-40 and the motorized valve 42 in order to control the quantity of liquid flowing out of the meters. The controller 17 receives the load representative signal from the drive 13 and it receives a signal from the flow meter 54, makes a comparison of the ratio of the signals to obtain an indication of the ratio (in parts-per-million) of oil relative to the grain, and adjusts the energization of the solenoids and the valve 42 to cause the actual rate to agree with a preset or desired rate as set by the adjustment 81. If the desired rate is to be adjusted, the adjustment indicated by the numeral 81 in FIG. 2 is made in order to change the desired rate of oil flow relative to the load quantity. The microprocessor controller 17 is programed, in a conventional manner, to energize the solenoids and the valve 42 to achieve the desired rates as shown in FIG. 4. The flowmeters 54, 43 and 74 may also be connected to visual indicators which may be mounted on the housing for the controller 17.

In practising the method of this invention, the solenoid valves and the motorized valve could be manually controlled. A person may view indicators connected to the flowmeters and to the winding 19 and operate the valves to produce the desired rate. To increase the parts-per-million ratio, the combinations of the energized valves may be selected to increase or decrease the total quantity of oil delivered for a given quantity of the material.

What is claimed is:

1. A system for controlling the operation of a plurality of nozzles for spraying a substance on a product, said nozzles having different flow volumes and being located adjacent the product, said system comprising first means for measuring the quantity of the product, third means for measuring the quantity of substance flowing through said nozzles, and second means responsive to said first and third means for opening selected nozzles to produce a desired ratio of the quantity of the substance to the quantity of the product, a plurality of said nozzles having fixed flow volumes, and at least one of said nozzles having fixed flow volumes, and at least one of said nozzles having an adjustable flow volume between on and off.

2. A system as set forth in claim 1, wherein said second means includes means for changing said desired ratio.

3. A system for spraying a substance on a product, comprising a plurality of nozzles, first means for flowing the substance to the nozzles at different flow volumes for said nozzles, and second means responsive to the quantity of the product for adjusting said first means to produce a desired ratio of the volume of the substance to the quantity of the product, said plurality of nozzles comprising a group of nozzles having different fixed flow volumes, and at least one nozzle having a variable flow volume, said group of nozzles including a first nozzle having a preset flow volume, a second nozzle having a preset flow volume which is substantially twice that of said first nozzle, and a third nozzle having a preset flow volume which is substantially twice that of said second nozzle.

4. A system as set forth in claim 3, wherein said second means is further operable to measure the quantity of the product, to measure the volume of the substance, to form an actual ratio of the quantity of the product to the volume of the substance, and to adjust said actual ratio to meet said desired ratio.

5. A system as set forth in claim 3, wherein the product is grain and the substance is oil.

6. A system as set forth in claim 3, wherein said nozzle having a variable flow volume has a volume which is variable between those of said first and second nozzles.

* * * * *